United States Patent [19]

Talbot et al.

[11] Patent Number: 5,679,984
[45] Date of Patent: Oct. 21, 1997

[54] VEHICLE SECURITY SYSTEM

[75] Inventors: Kevin Trevor Talbot, Lichfield; William Burdock, Sutton Coldfield, both of England

[73] Assignee: Rover Group Limited, Birmingham, England

[21] Appl. No.: 687,620

[22] PCT Filed: Feb. 16, 1995

[86] PCT No.: PCT/GB95/00327

§ 371 Date: Aug. 8, 1996

§ 102(e) Date: Aug. 8, 1996

[87] PCT Pub. No.: WO95/22475

PCT Pub. Date: Aug. 24, 1995

[30] Foreign Application Priority Data

Feb. 17, 1994 [GB] United Kingdom ............ 9403005
Apr. 9, 1994 [GB] United Kingdom ............ 9407072

[51] Int. Cl.$^6$ .................................. B60R 25/00
[52] U.S. Cl. .............. 307/10.3; 307/10.2; 307/10.4; 307/10.5; 180/287; 340/825.31; 70/256; 361/172
[58] Field of Search ................ 307/9.1–10.8; 180/287; 340/425.5, 426, 825.3–825.32, 825.34, 825.44, 825.69, 825.72; 364/423.098, 423.099, 424.037, 424.045, 424.059; 123/198 B; 70/237, 277, 278, 252, 256, 257, 370; 361/170, 171, 172, 179, 189, 190

[56] References Cited

U.S. PATENT DOCUMENTS

| | | | |
|---|---|---|---|
| 4,240,516 | 12/1980 | Henderson et al. | 307/10.2 |
| 4,738,334 | 4/1988 | Weishaupt | 180/287 |
| 4,758,835 | 7/1988 | Rathmann et al. | 361/172 |
| 4,835,407 | 5/1989 | Kataoka et al. | 307/10.5 |
| 4,868,409 | 9/1989 | Tanaka | 307/10.5 |
| 4,980,680 | 12/1990 | Knoll et al. | 370/10.5 |
| 5,019,812 | 5/1991 | Göstahagberg | 361/172 |
| 5,079,435 | 1/1992 | Tanaka | 307/10.2 |
| 5,351,042 | 9/1994 | Aston | 361/172 |
| 5,461,386 | 10/1995 | Knebelkamp | 340/825.31 |
| 5,532,522 | 7/1996 | Dietz et al. | 307/10.5 |
| 5,552,789 | 9/1996 | Schuermann | 340/825.31 |
| 5,561,420 | 10/1996 | Kleefeldt | 307/10.5 |
| 5,596,317 | 1/1997 | Brinkmeyer | 307/10.2 |

FOREIGN PATENT DOCUMENTS

| | | |
|---|---|---|
| 0153499 | 4/1988 | European Pat. Off. |
| 0297531 | 1/1989 | European Pat. Off. |
| 0314143 | 5/1989 | European Pat. Off. |
| 0356720 | 3/1990 | European Pat. Off. |
| 0212046 | 8/1991 | European Pat. Off. |
| 0521547 | 1/1993 | European Pat. Off. |
| 0525979 | 2/1993 | European Pat. Off. |
| 9314433.4 | 1/1994 | Germany. |
| 2164825 | 3/1986 | United Kingdom. |
| 2184774 | 7/1987 | United Kingdom. |
| 2202981 | 10/1988 | United Kingdom. |
| 2209050 | 4/1989 | United Kingdom. |
| 2227111 | 7/1990 | United Kingdom. |
| 2227791 | 8/1990 | United Kingdom. |
| 2233487 | 1/1991 | United Kingdom. |
| WO93/02897 | 2/1993 | WIPO. |

*Primary Examiner*—William M. Shoop, Jr.
*Assistant Examiner*—Peter Ganjian
*Attorney, Agent, or Firm*—Davis and Bujold

[57] ABSTRACT

The security system comprises a coil (34) close to the vehicle ignition lock (38), a control unit (10) for energizing the coil and a transponder which comprises a coil (32), a transistor (30) and a transmitter (24) and a power supply (26). In use the coil (32) picks up a conventional alternating magnetic signal emitted by the coil (34), and provides sufficient power to activate the transistor (30) which connects the power supply (26) to the transmitter (24) causing it to transmit an enabling signal to the control unit. The control unit may be programmed to re-mobilize the vehicle engine on receiving of the correct signal.

19 Claims, 3 Drawing Sheets

VEHICLE SECURITY SYSTEM

The present invention relates to vehicle security systems, and in particular to those including 'passive remobilization' which ensures that the vehicle will not remain immobilized if the driver has entered the vehicle and wants to start it using the proper key.

Passive re-mobilization systems are known, for example from EP 0 521 547 and WO 93/02897. WO 93/02897 discloses a security system in which a transmitter unit has an encoder and a transmitter which can be operated manually to transmit codes from the encoder. The transmitter unit also has electrical contacts through which the code from the encoder can be conducted to co-operating contacts near the vehicle ignition switch to re-mobilize the vehicle when the key is in the ignition lock.

It is an aim of the present invention to provide an improved security system which overcomes various problems with the known systems described above.

Accordingly the present invention provides a vehicle security system, comprising: a portable transmitter unit comprising a transmitter for transmitting a coded signal, a power source for the transmitter, and manual actuation means for causing the transmitter to transmit the coded signal; a receiver mounted on the vehicle; control means arranged to enable or disable a component of the vehicle in response to receipt of the coded signal by the receiver; an ignition lock on the vehicle; a key for operating the ignition lock; and means for producing an energy field if the key is used in the ignition lock while said component is disabled, characterized in that the transmitter unit further comprises switch means which can be operated by the energy field to connect the transmitter to the power supply to cause the transmitter to transmit the coded signal for reception by the receiver.

This arrangement can meet the above aim in a simple and cost-effective manner.

Preferably the energy producing means is mounted in the vehicle near to the ignition lock.

The use of the key required to cause transmission of the signal by comprise turning or otherwise moving the key to a particular position in the lock, or simply inserting the key into the lock, or any other similar action depending on the nature of the lock and key system.

Preferably the system further comprises key use detection means for detecting use of the key in the ignition lock wherein the control means is arranged to produce the energy field only if the detection means detects use of the key in the ignition lock.

Preferably the transmitter unit is attached to the key.

Said energy field may comprise an alternating magnetic field or electromagnetic radiation, in which case the means for producing said energy field preferably comprises a coil, and the switch means preferably includes a coil for producing an electromotive force in response to said energy field.

Alternatively the energy field may comprise a magnetic field of substantially constant direction, in which case the source of the magnetic field may be an electromagnet or a permanent magnet. In this case the switch means preferably has first and second electrical contact means at least one of which is made of a ferromagnetic material such that it will become magnetized and be attracted towards the other in the presence of said magnetic field. Such a switch means may comprise a reed switch and said at least one contact may comprise a reed thereof. Alternatively the switch means may comprise a hall effect device or other electronic device operated by a magnetic field.

Preferably the control means is arranged to unlock at least one door of the vehicle in response to receipt of an unlock signal from the transmitter unit if said unlock signal is produced by the manual actuation means, but not if said unlock signal is produced as a result of use of the key in the ignition lock.

Indeed the present invention further provides a vehicle security system comprising an ignition lock and a key for operating the lock, a transmitter for transmitting a coded unlock signal, first actuation means for causing the transmitter to transmit the coded unlock signal and second actuation means for causing the transmitter to transmit the coded unlock signal if the key is used in the ignition lock, wherein the control means is also arranged to unlock at least one door of the vehicle upon receipt of an unlock signal from the transmitter if said unlock signal is produced by the first actuation means, but not if said unlock signal is produced by said second actuation means.

The first actuation means may be a manual actuation means such as a push-button.

Preferably the second actuation means is actuated by a signal from the control means and the control means is arranged to determine whether the unlock signal was produced by the second actuation means by timing the delay between the sending of said signal and receipt of the unlock signal.

This arrangement is to allow for a situation where the driver has entered the vehicle and locked the doors for his own personal safety, and then starts the vehicle. In this situation the doors are not unlocked again by the system when the transmitter transmits the coded signal to enable the component of the vehicle. However the transmitter will still cause the doors to be unlocked (or locked) when it is used outside the vehicle.

The present invention still further provides a method of matching a transmitter unit which is arranged to transmit coded signals with a control unit forming part of a vehicle security system, the method comprising the steps of passing parameters of the coded signal from the control unit to the transmitter unit and storing them in memory in the transmitter unit.

Preferably said parameters comprise at least one encryption parameter. Alternatively they may comprise a code or a part thereof.

Preferred embodiments of the present invention will now be described by way of example only with reference to the accompanying drawings in which.

Figure 1:
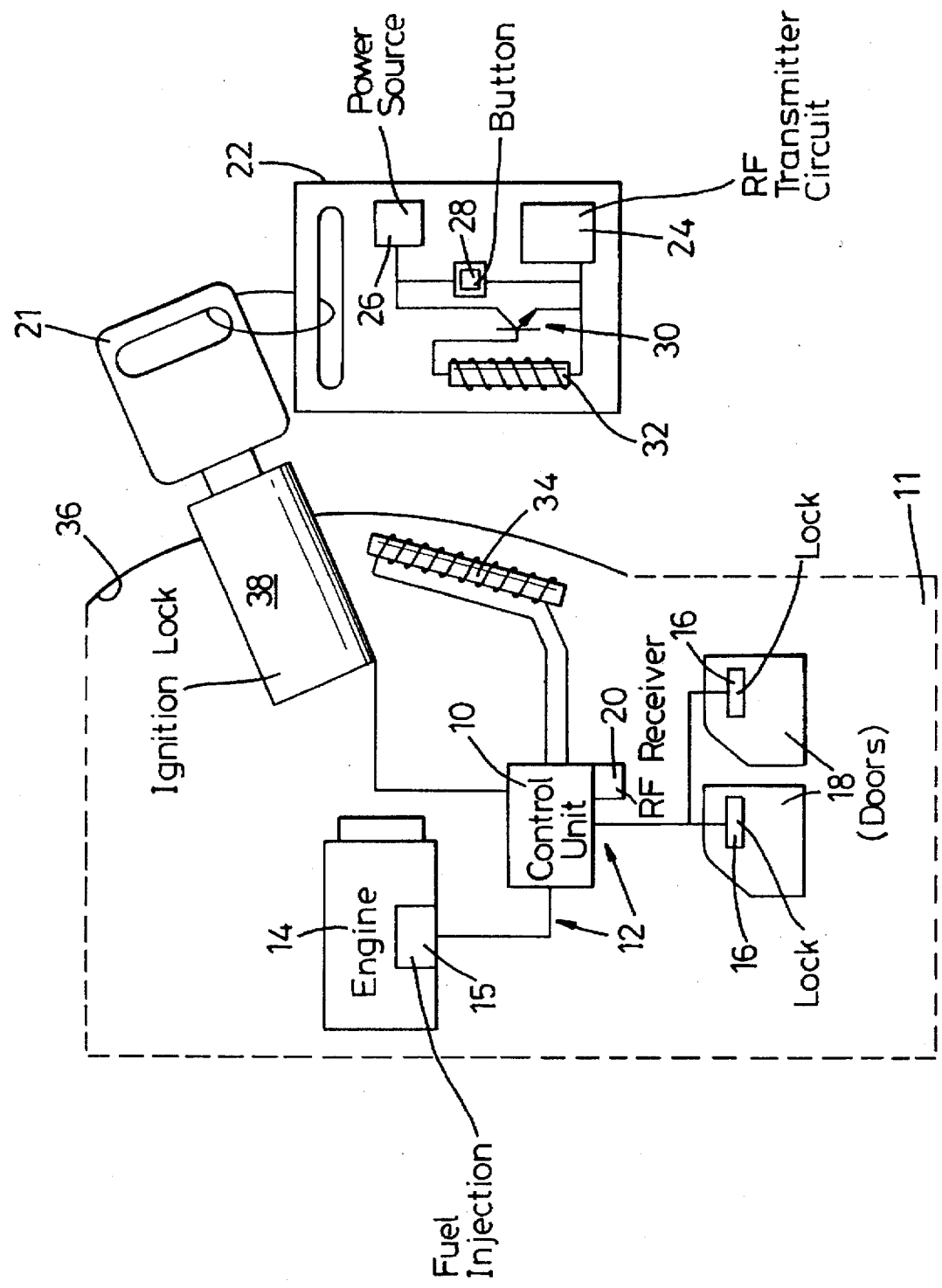
FIG. 1 is a diagrammatic view of a vehicle security system in accordance with a first embodiment of the invention.

Referring to FIG. 1, in the first embodiment of the invention, a security control unit 10 which is mounted on a vehicle 11 has various outputs 12 enabling it to immobilize the engine 14 of the vehicle, by disabling the fuel injection system 15, and operate locks 16 on the vehicle doors 18. The control unit 10 is connected to a radio frequency (RF) receiver 20 and is arranged to unlock the doors 18 and re-mobilize the engine 14 upon receipt of a coded RF unlock signal, and to lock the doors and immobilize the engine upon receipt of a coded lock signal. An ignition key 21 for the vehicle has an RF transmitter unit 22 attached to it. The transmitter unit 22 comprises an RF transmitter circuit 24 arranged to send coded RF unlock and lock signals, a power source 26 for the transmitter circuit, and an unlock button 28 for activating the transmitter manually to send the unlock signal by connecting the power supply 26 to the transmitter circuit 24. A lock button (not shown) is also provided to cause the transmitter to send the coded lock signal. The transmitter unit further comprises a transistor 30 and a coil 32 connected so that electromotive force induced in the coil can be used to cause the transistor to connect the power supply to the transmitter circuit 24.

A second coil 34 is connected to the control unit 10 and is housed in a cowl 36 of the vehicle, close to a vehicle ignition lock 38. The control unit 10 is connected to the normal electrical outputs from the ignition lock 38 so that it can sense when the ignition key is present in the ignition lock, and when it is in the auxiliary, ignition and crank positions.

Normally when the driver approaches the vehicle he will re-mobilize the engine 14 and unlock the doors 18 by pressing the unlock button 28. However if he has unlocked the doors using the key 21 in the door locks 16 the engine may still be immobilized when he enters the vehicle. This is particularly likely to happen if the security control unit 10 is programmed to immobilize the engine automatically when the driver leaves the vehicle. The control unit 10 is therefore arranged to detect the situation when the engine is immobilized and the key 21 is turned to the auxiliary position in the ignition lock 38.

In this situation the control unit passes an AC current through the coil 34 which induces a current in the coil 32 in the transmitter unit 22. This causes the transistor 30 to connect the power supply 26 to the transmitter circuit 24 which transmits its coded unlock signal. This signal is picked up by the receiver 20 and compared by the control unit 10 to a code stored in memory. If the codes are the same the control unit re-mobilizes the engine 14 by re-enabling the fuel injection system 15, and the driver can start the car in the usual way.

If for security reasons the vehicle user should enter the vehicle and lock the doors 18 mechanically (by depressing the usual locking button on the door) it is important that the doors do not unlock when the coded unlock signal is transmitted to the control unit 10 as the ignition is switched on. The control unit 10 is therefore programmed to recognize when the coded unlock signal has been sent as a result of use of the key 21 in the ignition lock 38, and to leave the state of the vehicle door locks unchanged whilst still re-mobilizing the engine. Because the control unit 10 causes the coil 34 to transmit its signal it can determine whether the unlock signal has been produced in response to a signal from the coil 34 simply by timing the delay between sending the signal from the coil 34 and receipt of the unlock signal. If the delay is less than a predetermined time then the door locks can be left in the locked state. Alternatively the control unit could be arranged to unlock the doors only of the unlock signal was received and the key was not detected in the ignition lock.

When the ignition key 21 is removed from the ignition lock 38, and the ignition is thus disabled, the control unit 10 automatically immobilizes the engine; thereafter the vehicle doors 18 may be locked mechanically or by using the lock button on the transmitter unit 22.

The transmitter circuit 24 includes a memory in which a code is stored together with an encryption algorithm which encrypts the code before it is transmitted as a coded signal. The control unit 10 has a corresponding memory in which the code and the algorithm are also stored. The coded signal is therefore deciphered using the algorithm before it is compared with the code in the memory of the control unit 10. When a transmitter unit needs to be matched to the vehicle, the control unit 10 is made to transmit the encryption algorithm, preceded by an identification code, to the transmitter unit 22 which recognizes the identification code and stores the following algorithm in its memory. The transmitter unit 22 is then used to transmit a code stored in its memory, using the encryption algorithm, to the control unit 10 five times within five seconds. The control unit recognizes this as an instruction to store the code, after deciphering, in its memory, overwriting any code which is stored there already. In this way a uniquely coded transmitter and a control unit having one of a large number of possible encription algorithms can be matched up for subsequent use.

It will be appreciated that instead of a whole encryption algorithm, one or more encryption parameters or a part or the whole of the code could be transmitted from the control unit to the transmitter.

Figure 2:
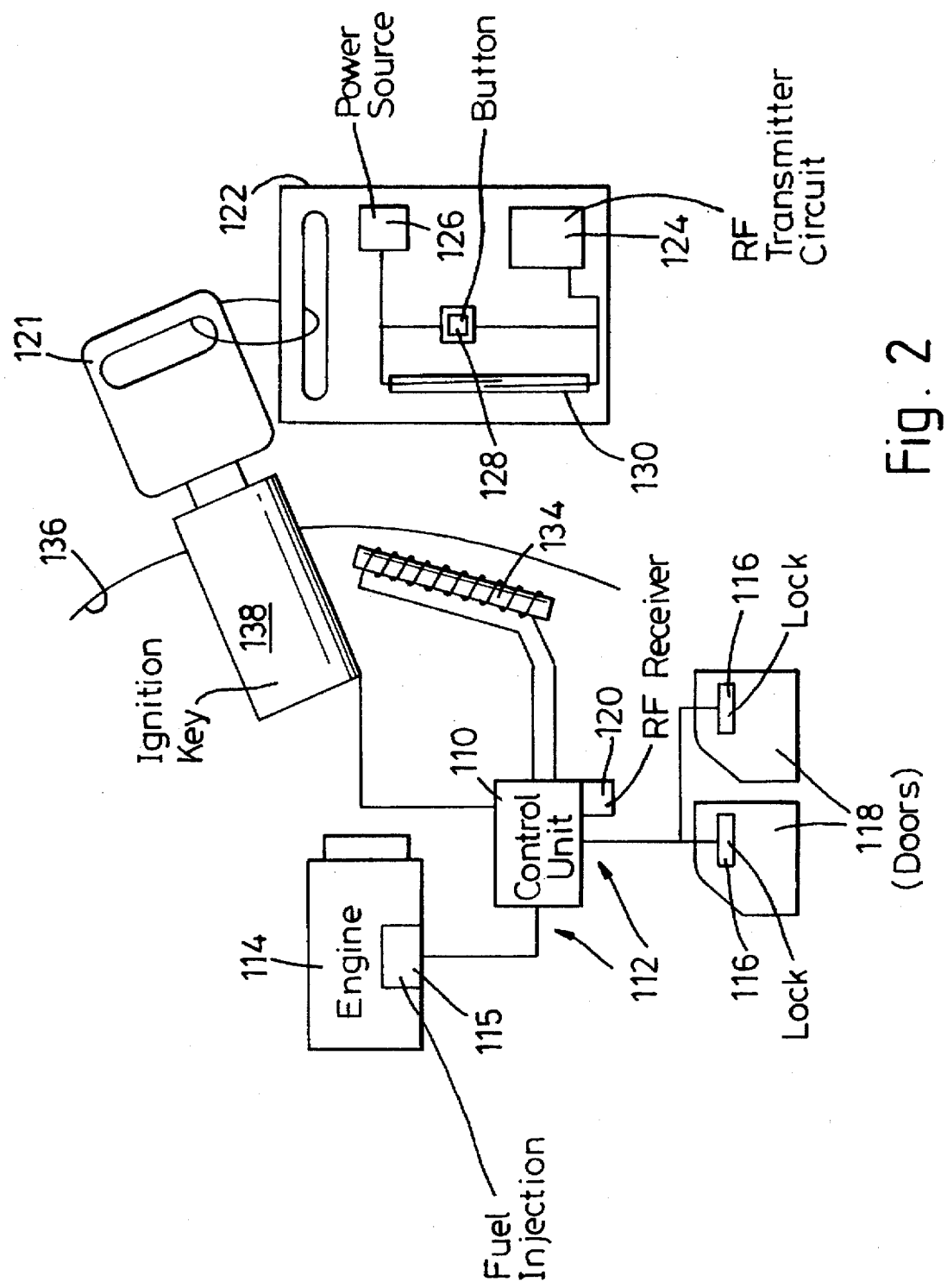
FIG. 2 is a diagrammatic view of a vehicle security system in accordance with a second embodiment of the invention.
Figure 3:
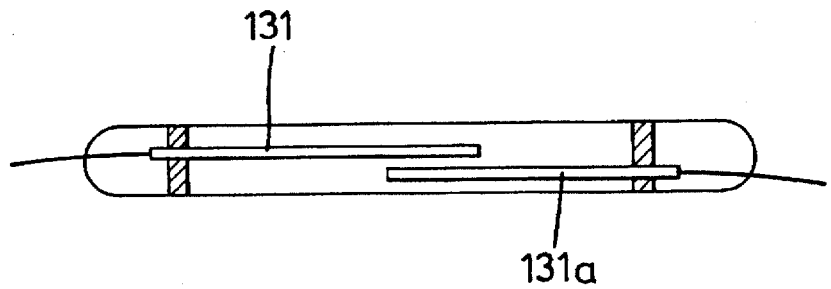
FIG. 3 is a diagrammatic view of a reed switch in the embodiment of FIG. 2.

Referring to FIG. 2, the second embodiment of the invention is similar to the first, and corresponding features are indicated by the same reference numerals preceded by a 1. In place of the coil 30, a magnetically operated switch means in the form of a reed switch 130 is provided which can activate the transmitter circuit 124 as described below. The reed switch 130 is shown in more detail in FIG. 3 and has two contacts 131, 131a which are made of a flexible magnetic material. The contacts 131, 131a are supported such that they normally lie parallel to one another but are spaced a small distance apart.

When the control unit 110 detects the situation when the engine 114 is immobilized and the key 121 is turned to the auxiliary position in the ignition lock 138, the control unit energizes the coil 134 by passing a DC current through it, thereby causing it to become magnetized. The magnetic field produced by the coil 134 is of constant direction and will magnetize the contacts 131, 131a of the reed switch 130, which will be attracted to one another, connecting the power supply 126 to the transmitter circuit 124.

As a variation on the second embodiment described above with reference to FIGS. 2 and 3, the coil 134 could be connected to a simple DC power supply via a switch which is operated by turning the key 121 in the ignition lock 138. A positive temperature coefficient (PTC) device or a suitable timing device could also be used to turn off the power to the coil 134 after a predetermined time to ensure that it was only energized for long enough to re-mobilize the engine.

Figure 4:
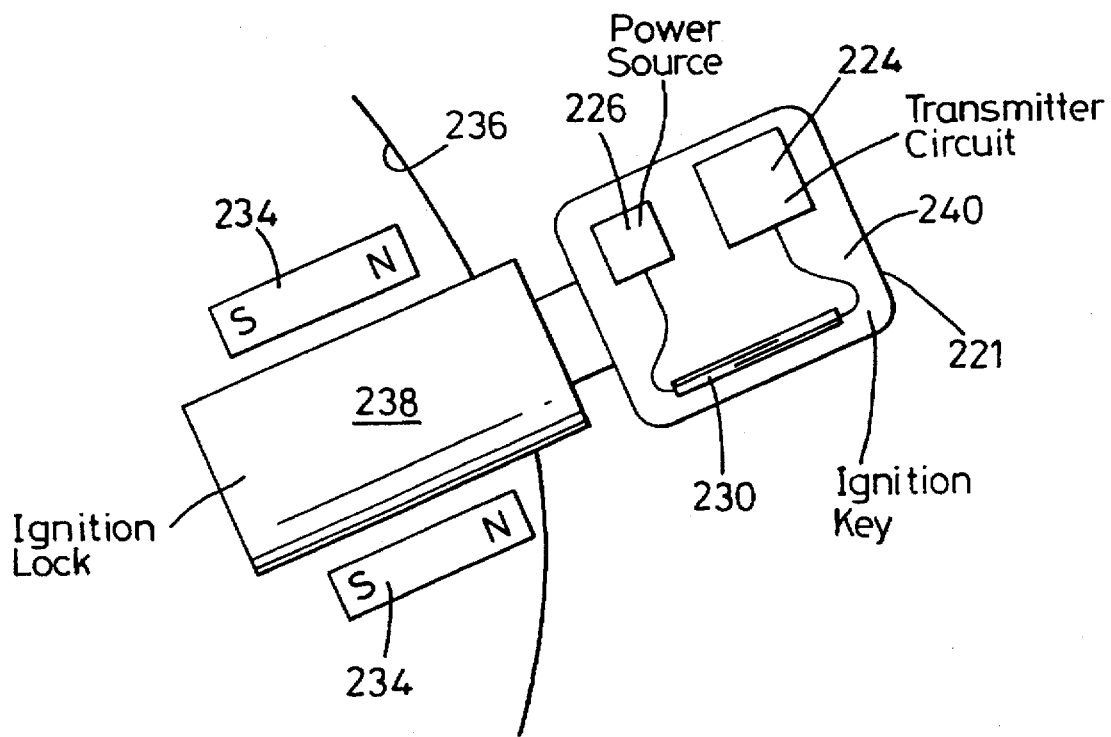
FIG. 4 is a diagrammatic view of a vehicle security system in accordance with a third embodiment of the invention.

Referring to FIG. 4 the third embodiment of the invention differs from the second in that the transmitter circuit 224, power source 226 and reed switch 230 are mounted on the head 240 of the ignition key 221. Also, instead of an electromagnet, or coil, a permanent magnet 234 is mounted in the cowl 236 close to the ignition lock 238. In this way there is no need for monitoring the position of the key in the ignition. Instead the permanent magnet is made of a suitable strength such that the reed switch 230 will be closed whenever the key is brought within a specific range of the magnet 234. This range can be of the order of a few centimeters so the switch will generally only close when the key is actually inserted in the ignition lock 138.

We claim:

1. A security system for a vehicle which includes a component, the system comprising: a portable transmitter unit comprising a transmitter for transmitting a coded signal, a power source for the transmitter, and manual actuation means for causing the transmitter to transmit the coded signal; a receiver for mounting on the vehicle; control means arranged to enable or disable said component in response to receipt of the coded signal by the receiver; an ignition lock for the vehicle; a key for operating the ignition lock; and means for producing an energy field if the key is used in the ignition lock while said component is disabled, wherein the transmitter unit further comprises switch means which can be operated by the energy field to connect the transmitter to the power supply to cause the transmitter to transmit the coded signal for reception by the receiver.

2. A system according to claim 1 wherein the energy producing means is mounted in the vehicle near to the ignition lock.

3. A system according to claim 1 further comprising key detection means for detecting use of the key in the ignition lock wherein the control means is arranged to produce the energy field only if the detection means detects use of the key in the ignition lock.

4. A system according to claim 1 wherein the control means is arranged to produce the energy field only if the component is disabled.

5. A system according to claim 3 wherein the transmitter unit is attached to the key.

6. A system according to claim 1 wherein said energy field is an alternating magnetic field.

7. A system according to claim 1 wherein said energy field comprises electromagnetic radiation.

8. A system according to claim 1 wherein the means for producing said energy field comprises a coil.

9. A system according to claim 1 wherein the switch means includes a coil for producing an electromotive force in response to said energy field.

10. A system according to claim 1 wherein the energy field comprises a magnetic field of substantially constant direction.

11. A system according to claim 10 wherein the source of the magnetic field is an electromagnet.

12. A system according to claim 10 wherein the source of the magnetic field is a permanent magnet.

13. A system according to claim 10 wherein the switch means has first and second electrical contact means at least one of which is made of a ferromagnetic material such that it will become magnetized and be attracted towards the other in the presence of said magnetic field.

14. A system according to claim 13 wherein the switch means is a reed switch and said at least one contact comprises a reed thereof.

15. A system according to claim 1 wherein the the vehicle includes at least one door and control means is arranged to unlock said at least one door in response to receipt of an unlock signal from the transmitter unit if said unlock signal is produced by the manual actuation means, but not if said unlock signal is produced as a result of use of the key in the ignition lock.

16. A security system for a vehicle including at least one door, the system comprising an ignition lock and a key for operating the lock, a transmitter for transmitting a coded unlock signal, first actuation means for causing the transmitter to transmit the coded unlock signal, second actuation means for causing the transmitter to transmit the coded unlock signal if the key is used in the ignition lock, and control means arranged to determine whether the unlock signal has been produced as a result of use of the key in the ignition lock and to unlock said at least one door upon receipt of the unlock signal from the transmitter if said unlock signal is produced by the first actuation means, but not if said unlock signal is produced by the second actuation means.

17. A system according to claim 16 wherein the second actuation means is actuated by a signal from the control means and the control means is arranged to determine whether the unlock signal was produced by the second actuation means by timing the delay between the sending of said signal and receipt of the unlock signal.

18. A system according to claim 9 wherein the transmitter unit includes a memory which is connected to said coil so that at least one parameter of the coded signal stored in the control means can be transmitted to the transmitter unit and stored in the memory thereby to match the transmitter and the control unit.

19. A system according to claim 18 wherein said at least one parameter comprises at least one encryption parameter.

* * * * *